3,600,384
REACTION OF 1,2 - BIS(3-CYCLOHEXEN-1-YL)
ETHYLENES WITH CERTAIN UNSATURATED
COMPOUNDS AND PRODUCT OBTAINED
THEREBY
Hans D. Holtz, Bartlesville, Okla., assignor to
Phillips Petroleum Company
No Drawing. Continuation-in-part of abandoned application Ser. No. 502,293, Oct. 22, 1965. This application Nov. 15, 1968, Ser. No. 776,265
Int. Cl. C07c 53/28
U.S. Cl. 260—240            3 Claims

ABSTRACT OF THE DISCLOSURE 1,2-bis(3-cyclohexen-1-yl)ethylenes are reacted with unsaturated compounds such as maleic anhydride to produce novel compounds which are useful as curing agents for epoxy resins, as components of alkyl resins and the like, and as starting materials for the production of polyimide resins.

This is a continuation-in-part of copending application Ser. No. 502,293, filed Oct. 22, 1965, now abandoned.

The present invention relates to new compositions of matter and to methods of preparation of these new compositions of matter. In one aspect this invention relates to reacting maleic anhydride with 1,2-bis(3-cyclohexen-1-yl)ethylene. In another aspect this invention relates to novel succinic anhydride derivatives of 1,2-bis(3-cyclohexen-1-yl)ethylene.

The 1,2-bis(3-cyclohexen-1-yl)ethylene employed as the starting material in the practice of this invention is described in a copending application of D. L. Crain (Ser. No. 665,239, filed Sept. 5, 1967, now U.S. 3,463,828, which is a continuation-in-part of Ser. No. 502,544, filed Oct. 22, 1965, and assigned to a common assignee, Phillips Petroleum Company of Bartlesville, Oklahoma. The above-referenced application discloses the preparation of the starting materials of this invention by contacting an alkenyl-substituted cycloalkene with a molybdenum or tungsten containing catalyst.

In accordance with this invention, novel products are produced by the reaction of 1,2-bis(3-cyclohexen-1-yl) ethylenes with maleic anhydride. These products are characterized by the following structural formulas:

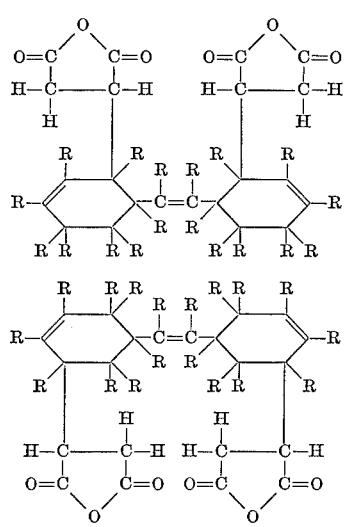

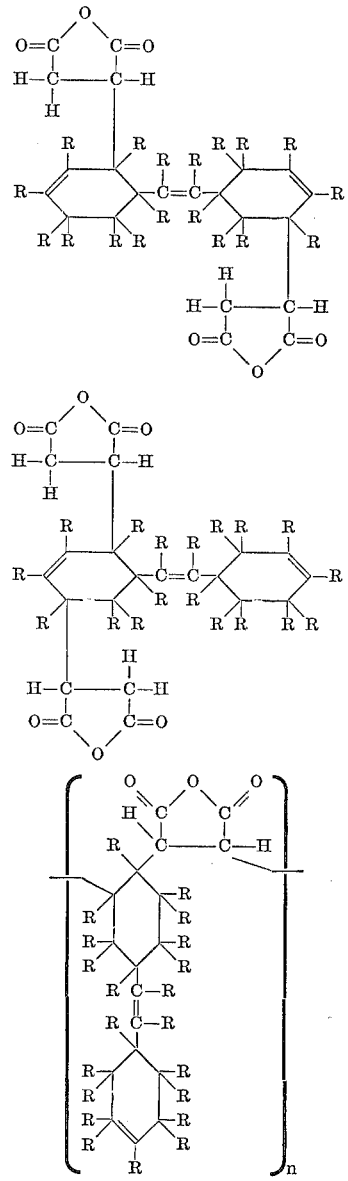

wherein R is selected from the group consisting of hydrogen, methyl, and ethyl and $n$ is an integer from 2 to 3.

The starting materials, which are useful in the practice of this invention, are characterized by the following general formula:

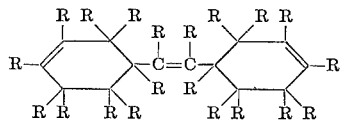

where R is at least one member selected from the group consisting of hydrogen, methyl and ethyl, the total number of carbon atoms in all of said R groups preferably being not greater than 8; at least one of said R groups in each of at least two positions allylic to an olefinic double bond being hydrogen. Specific examples are as follows:

1,2-bis(3-cyclohexen-1-yl)ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene 1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2-bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene
1-(3-cyclohexen-1-yl)-2-(2-methyl-3-cyclohexen-1-yl)ethylene.

In place of maleic anhydride, it is within the scope of this invention to employ other unsaturated compounds having an activating group attached to one or both of two carbon atoms linked together by an olefinic double bond. Some examples of other unsaturated compounds which can be employed include acids such as maleic acid, fumaric acid, acrylic acid, and crotonic acid, as well as derivatives thereof such as: esters such as dimethyl maleate and ethyl acrylate; amides such as maleamide and acrylamide; nitriles such as acrylonitrile and crotononitrile; aldehydes such as acrolein and crotonaldehyde; and ketones such as methyl vinyl ketone and ethyl vinyl ketone.

Although the mol ratio of activated unsaturated compound to triolefin can vary over a broad range, it is preferred that the mol ratio of activated unsaturated compound to triolefin be maintained within the range of about 1:1 to 3:1, a mol ratio of approximately 2:1 being most desirable. A small amount of a polymerization inhibitor such as hydroquinone, ionol, or the like can be used. The reaction is carried out in the substantial absence of oxygen, e.g., through use of an atmosphere of inert gas such as nitrogen. Although the reaction temperature can vary over a broad range, it will generally be within the range of about 60–600° F., usually being within the range of about 200–500° F. The desired reaction time also varies considerably, depending in part on the reaction temperature and the nature of the reactants, but will generally be within the range of about 10 minutes to about 2 days, usually being within the range of about 30 minutes to about 12 hours. If desired, a solvent can be employed, the solvent being one which does not deleteriously react with either the reactants or products. Examples of some suitable solvents include nonolefinic hydrocarbons such as hexane, octane, benzene, toluene, and xylene; ethers such as ethyl ether, 1,2 - dimethoxyethane, and dioxane; and amides such as dimethylformamide, dimethylacetamide, and N-methylpyrrolidone. The pressure need be only sufficient to maintain the reaction mixture substantially in the liquid phase. The reaction products are conveniently separated from the reaction mixture by extraction or other suitable process. If desired, the products can be hydrolyzed or otherwise converted to other substances prior to isolation.

These products have utility in applications requiring the use of an unsaturated compound containing one or more functional groups. For example, the adducts and copolymers produced by the reaction of the triolefins with maleic anhydride are useful as curing agents for epoxy resins and as components of alkyd resins. They also undergo reaction with alkylenediamines to give useful polyimide resins, which, if desired, can be crosslinked with a radical curing agent. Additionally, they have utility as components of paints and varnishes, and as drilling fluid additives. If desired, they can be solvolyzed or otherwise treated to give other useful substances.

The present invention will be more clearly understood from the consideration of the following experiment which helps to define the reaction conditions utilized to obtain preferentially succinic anhydride derivatives of 1,2-bis(3-cyclohexen - 1 - yl)ethylene and some higher molecular weight material.

EXAMPLE I

A mixture of 89 grams (0.47 mol) of trans-1,2-bis(3-cyclohexen-1-yl)ethylene, 89 grams (0.82 mol) of maleic anhydride, 100 ml. of toluene, and 0.1 gram of hydroquinone was heated in a 500-ml. stainless steel rocking bomb at 400±5° F. for 7⅓ hours under nitrogen at a pressure of 100 p.s.i.g. After removal of the solvent 24 grams of trans-1,2-bis(3-cyclohexen-1-yl)ethylene and 15 grams of maleic anhydride were recovered by vacuum distillation. The distillation residue was then shaken with 300 ml. of toluene. The toluene-insoluble fraction was filtered off, washed with cyclohexane, and dried, giving 40 grams of a white powder (Product A). The toluene-soluble fraction was freed of toluene and then treated with an excess of hot aqeous potassium hydroxide. After cooling, the basic solution was extracted with ether, acidified with concentrated hydrochloric acid, and again extracted with two 500-ml. portions of ether. The latter extracts were dried over calcium sulfate and filtered. Removal of the ether gave 45 grams of a white powder (Product B).

Product B was identified as the hydrolyzed adduct ($C_{22}H_{28}O_8$) of two molecules of maleic anhydride with one molecule of trans-1,2-bis(3-cyclohexen-1-yl)ethylene, the hydroyzed adduct having a 1,2-dicarboxyethyl substituent in each of two positions allylic to an olefinic double bond. Upon heating, a sample of the hydrolyzed adduct began to soften at 80° C., at which temperature it commenced decomposing with anhydride formation, becoming completely molten at 120° C. Identification of the hydrolyzed adduct was made by elemental analysis, by osmometric determination of molecular weight (in methyl ethyl ketone), and by determination of proton distribution by nuclear magnetic resonance study (in acetone-$d_6$). The results of these studies are shown in Table I.

TABLE I

|  | Calculated for the hydrolyzed adduct $C_{22}H_{28}O_8$ | Found |
| --- | --- | --- |
| Carbon, weight percent | 62.8 | 63.5 |
| Hydrogen, weight percent | 6.7 | 7.2 |
| Molecular weight | 420 | 437 |
| Carboxyl protons, percent | 14.3 | 15.1 |
| Vinyl protons, percent | 21.4 | 21.1 |
| Other protons, percent | 64.4 | 63.8 |

In addition, the infrared spectrum of the hydrolyzed adduct $C_{22}H_{28}O_8$ indicated the presence of carboxyl groups and was consistent with that to be expected for the assigned structure.

Product A was identified as a compound of 1,2-bis(3-cyclohexen-1-yl)ethylene and maleic anhydride having an elemental analysis as shown in Table II, molecular weight determined by osmometric molecular weight determination (in methyl ethyl ketone), and determination of proton distribution by nuclear magnetic resonance study (in acetone-$d_6$).

TABLE II

| | |
| --- | --- |
| Carbon, wt. percent | 66.7 |
| Hydrogen, wt. percent | 5.9 |
| Molecular weight | 607 |
| Vinyl protons, percent | 17.2 |
| Other protons, percent | 82.8 |

The observed molecular weight of this copolymer was greater than that (581) of an adduct of four molecules of maleic anhydride and one molecule of the triolefin, whereas the percent of total number of protons which were vinyl protons was 20 percent less than that (21.4 percent) which would be present in the simple 4:1 adduct. Thus, the fact that only 17.2 percent of the total number of protons were vinyl protons must be ascribed to particcipation of one or more of the olefinic linkages in the triolefin in a polymerization process. The infrared spectrum of the copolymer indicated the presence of anhydride groups and the absence of carboxyl groups. Thus a polymer of about 600 molecular weight is produced by this process.

EXAMPLE II

The maleic anhydride-trans-1,2-bis(3-cyclohexen-1-yl) ethylene reaction product of Example I in an amount of 0.84 gram (the toluene soluble fraction after being freed of toluene and dried but before hydrolysis) was mixed for 15 minutes at 100–150° C. with 1.90 grams Epon 828, a commercial Bisphenol A-epichlorohydrin epoxy resin manufactured by Shell Chemical Company having an equivalent weight of 190; the mixture thus being on a 1 to 1 equivalent weight ratio of reaction product to epoxy. DMP–30 catalyst was added to this mixture in a ratio of approximately 0.025 g. DMP–30 to 1.74 grams of the mixture and the stirring continued for 5 minutes at 125–140° C. DMP–30 is tris(2,4,6 - dimethylaminomethyl) phenol. A portion of this mixture was applied to precleaned aluminum coupons for lap shear tests, another portion applied to precleaned steel panels for coating properties, and the remainder of the mixture left in a container for Shore D hardness tests. For comparison, maleic anhydride was used as a curing agent in place of the product of the invention under essentially identical conditions. All of the samples were then cured for 4–5 hours at 150° C. The properties of the resulting cured resins were as follows.

TABLE III

Performance Properties of Epon 828 Cured with Various Anhydride Hardeners

| No. | Hardener | Shore D hardness, 25° C. | Pencil hardness | Adhesive lap shear strength, p.s.i. |
|---|---|---|---|---|
| 1 | Maleic anhydride (Control) | 90 | F | 2,010 |
| 2 | Product of invention | 78 | 7H | 2,114 |

Obviously many modifications and variations of the present invention are possible in the light of the above teachings. It is therefore to be understood that within the scope of the appended claims the invention may be practiced otherwise than as specifically described herein.

I claim:
1. The reaction product of 1,2-bis(3-cyclohexen-1-yl) ethylene and maleic anhydride, said reaction product having a molecular weight of about 600 and prepared by reacting 1,2-bis(3-cyclohexen-1-yl)ethylene with maleic anhydride at a temperature of 400° F. at a pressure of 100 p.s.i.g. employing a mol ratio of 1,2-bis(3-cyclohexen-1-yl)ethylene to maleic anhydride of about 1:2.

2. A composition of matter consisting essentially of the tolene soluble fraction of the reaction product of 2 moles of maleic anhydride with 1 mol of a triolefin having the following formula:

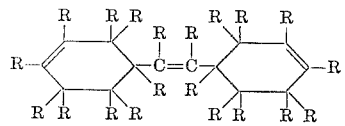

where R is at least one member selected from the group consisting of hydrogen, methyl and ethyl, the total number of carbon atoms in all of said R group being not greater than 8, at least one of said R groups in each of at least two positions allylic to an olefinic double bond being hydrogen, said reaction product being formed at a temperature in the range of 60 to 600° F.

3. A composition according to claim 2 wherein said triolefin is 1,2-bis(3-cyclohexen-1-yl)ethylene.

References Cited

Alder et al.: Ber. Deut. Chem., vol. 76, pp. 27 to 31 and 48 (1943).

Alder et al.: Annalen der Chemie, vol. 565, pp. 99 to 105, 108–111 (1949).

JOHN D. RANDOLPH, Primary Examiner

U.S. Cl. X.R.

260—2, 78, 78.5, 464, 468, 514, 561, 586, 598, 666